March 25, 1969 — G. W. GREEN — 3,434,459
AUTOMATED ANIMAL FEEDER
Filed Nov. 10, 1966 — Sheet 1 of 2
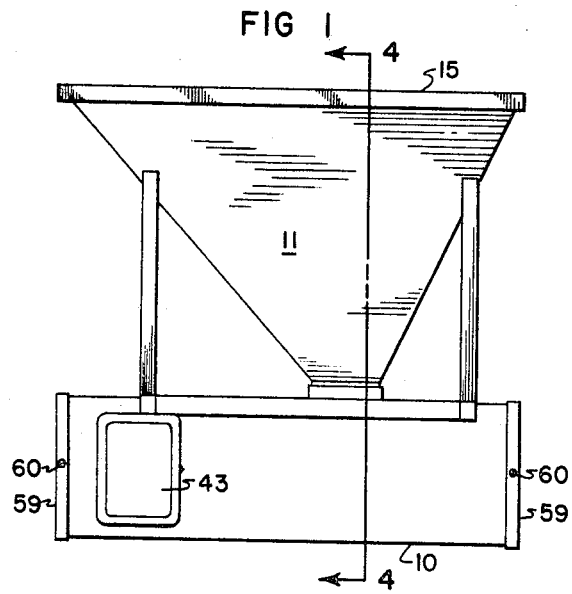
FIG 1
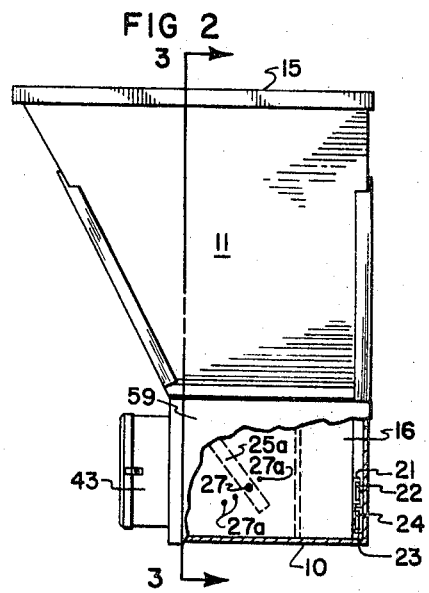
FIG 2
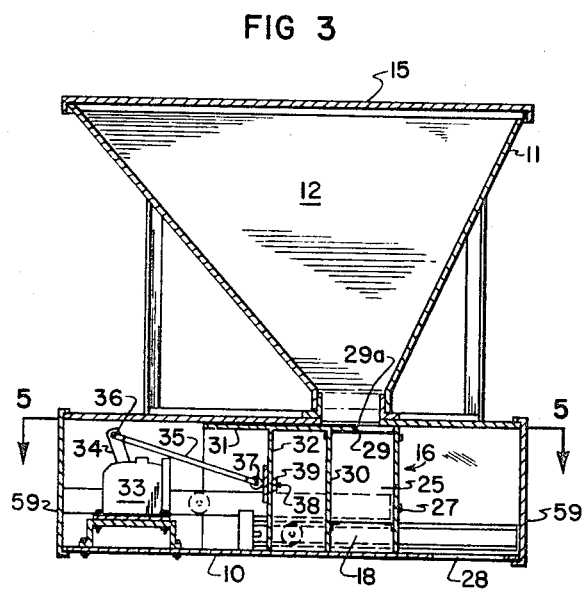
FIG 3
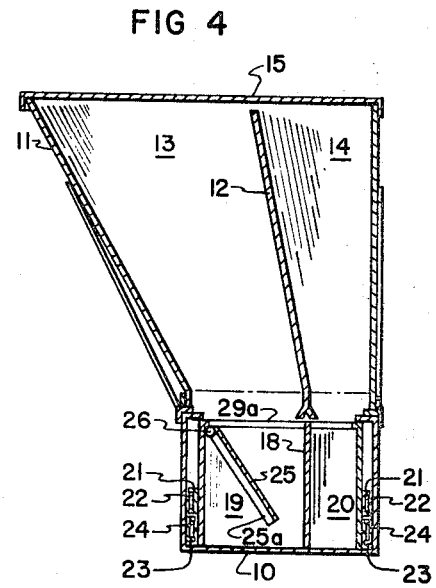
FIG 4
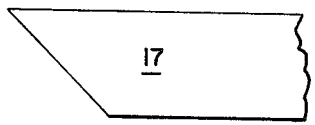
INVENTOR:
GLOYD W. GREEN.
BY:
MALLINCKRODT & MALLINCKRODT
ATTORNEYS March 25, 1969  G. W. GREEN  3,434,459
AUTOMATED ANIMAL FEEDER Filed Nov. 10, 1966  Sheet 2 of 2

INVENTOR:
GLOYD W. GREEN.
BY:
MALLINCKRODT & MALLINCKRODT
ATTORNEYS

United States Patent Office 3,434,459
Patented Mar. 25, 1969

3,434,459
AUTOMATED ANIMAL FEEDER
Gloyd W. Green, 1123 West 5th North,
Salt Lake City, Utah 84116
Filed Nov. 10, 1966, Ser. No. 593,522
Int. Cl. A01k *5/02*
U.S. Cl. 119—51.11 1 Claim

ABSTRACT OF THE DISCLOSURE

An automated feeder for dispensing measured amounts of feed including a drawer reciprocated by a timer controlled motor. The drawer is provided with a cutting blade and means for changing the capacity of the same. The drawer is positioned in a housing having an inlet opening to a hopper and an offset discharge opening to a trough.

---

Figure 5:
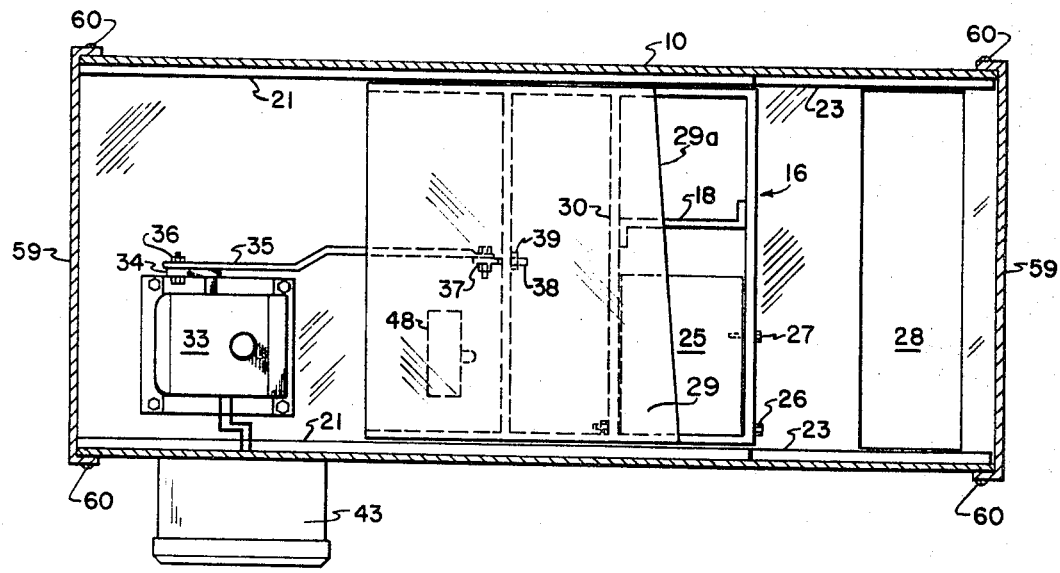

This invention relates to devices for automatically feeding animals at preset time intervals.

Many people who live in urban areas desire to own horses and/or other livestock. However, due to the expense involved in owning urban land for such purposes they are frequently forced to keep the animals in a more remote area. This works a considerable hardship on such an owner and forces him to make daily trips to feed the animals or to hire someone in the near vicinity to care for them, since an animal's good health depends on his being fed the proper feed on a regular schedule. The use of hired help is not only expensive but often unsatisfactory, for even with such help the animals may not be fed on schedule or they may not receive a proper mixture of feeds.

Accordingly, it is an object of the present invention to provide a means for feeding livestock a predetermined amount of feed, automatically and at preset time intervals.

It is also an object to provide a means for feeding animals predetermined proportions of different feeds, such as pelleted hay and grain.

Although particularly useful to urban residents such as those described above, it is obvious that others could as well use the invention to insure proper animal feeding, with a minimum amount of human attention.

While other devices have been developed for automatically moving grain and other feed, by conveyor, from a supply source to a feed trough, these have not been entirely suitable from the standpoints of expense, or in their manner of operation when limited number of livestock, such as horses and cattle, are being cared for.

In accordance with the objects of this invention I have provided an automated stock feeder which will deliver at least two different kinds of feed to the feeding area. The feeder of my invention employs a power-reciprocated drawer having separate compartments capable of receiving at least two different feeds simultaneously from a divided feed hopper, and of dropping the feeds into a feed trough. Baffle means are provided to pre-set the amount of feed received by the compartments. The drawer is time-controlled so that the feed can be delivered to the feed trough at pre-set intervals.

There is shown in the accompanying drawings a specific embodiment of the invention representing what is presently regarded as the best mode of carrying out the generic concepts in actual practice. From the detailed description of this presently preferred form of the invention, other more specific objects and features will become apparent.

Figure 6:
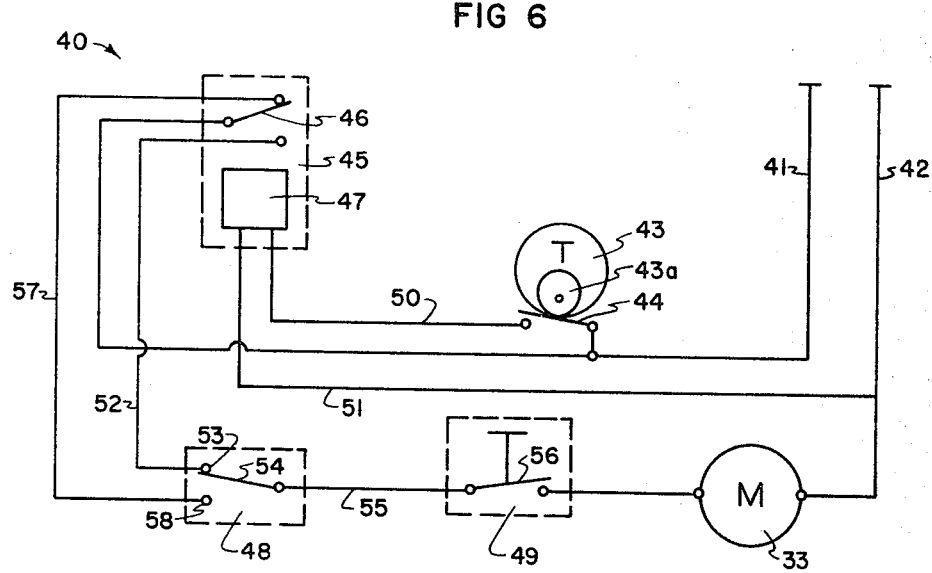

In the drawings:

FIG. 1 is a side elevation view of the feeder;

FIG. 2, an end elevation view, with the end cover partially broken away to show the drawer and the baffle positioning means;

FIG. 3, a longitudinal vertical section taken on the line 3—3 of FIG. 2;

FIG. 4, a transverse vertical section taken on the line 4—4 of FIG. 1;

FIG. 5, a horizontal section taken on the line 5—5 of FIG. 3, and showing a top plan view of the feed drawer; and FIG. 6, a schematic circuit diagram showing how the mechanism is operated and controlled.

Referring now to the drawings:

In the illustrated preferred embodiment, the feeder comprises an elongate housing 10, which may be square in cross section, and which, in use, will normally extend generally horizontally. Supported on top of the body is a feed hopper 11 provided with a large opening or mouth at its upper end but converging toward its lower or discharge end. The hopper 11 has a vertical partition 12 fixed therein that divides the interior of the hopper into two bins 13 and 14, FIG. 4, for respectively receiving separated feeds such as hay pellets and grain. However, it is within the scope of my invention to arrange a plurality of partitions (not shown) so as to provide more than two bins within the hopper. The hopper can be as large as desired and serves as a storage receptable for feeds dumped into its open end or mouth. A cover 15 preferably fits tightly over the open top of the hopper to prevent moisture, dirt, etc. getting into the feed. The separated feeds fall through the open bottom of the hopper to a drawer 16.

As illustrated, drawer 16 is four-sided, open at the top to receive feeds from the hopper 11 and open at the bottom to discharge the same to a feed trough, shown fragmentarily at 17. A vertical partition 18, positioned beneath the partition 12, of the hopper divides the drawer into two compartments 19 and 20, FIG. 4, that correspond to and that are respectively positioned beneath the bins 13 and 14 of hopper 11 when the drawer is in its filling position. If the hopper is divided to have more than two bins, the drawer may be similarly divided. The drawer has an upper track 27 attached to each side and movable therewith. A roller 22, mounted on the inside of each side wall of the housing, at the rear of the drawer, rolls inside each track 21. A lower track 23 is also fixed to the inside of each side wall of the housing and rollers 24, mounted at the front of the drawer roll therein. When the drawer is positioned as illustrated, compartments 19 and 20 will be filled to the top with the two feeds flowing from the hopper compartments 13 and 14 through the opening. The amount of feed supplied to compartment 19 can be varied in accordance with the positioning of a baffle 25 that is pivoted at 26 to the upper inside corner of compartment 19. A sheet metal screw 27, passed through one of a plurality of holes 27a in an end wall of drawer and screwed into a hole provided therefore in a side flange 25a of the baffle holds the baffle in selected position to block out a desired portion of the compartment. Although some feed can fall through the opening between the baffle and partition 18 as the drawer is filled, the greatest portion will be retained on the baffle.

When the feeds, which, for example, may be hay pellets in bin 13 and oats in bin 14, fall from the hopper 11 into the drawer 16 they accumulate on the bottom of housing 10, within their respective compartments 19 and 20. The drawer is then moved from beneath the outlet opening hopper 10, over a discharge opening 28 in the bottom of housing and back again to the illustrated position. As the drawer is reciprocated, the feeds are pushed along the bottom of housing 10 until they fall through the opening 28 to the feed trough 17. As they fall into the trough 17 the feeds are mixed.

A cutting blade 29, having an edge 29a extending diagonally across the compartments 19 and 20 protrudes from the upper edge of the rear wall 30 of the drawer above partition 18 and cuts through any feed that might otherwise block reciprocation of the drawer. A flat cover plate 31 that protrudes rearwardly from the top edge of the drawer to interconnect the rear wall 30 of the drawer and a wall 32 has its upper flat surface substantially in the plane of the uppermost edges of the drawer. Thus, as the drawer is moved from beneath the outlet opening of hopper 10 the plate 31 covers the opening to prevent feeds falling into housing 10.

The drawer is reciprocated by a suitably geared electric motor 33 that drives an arm 34 to which one end of a link 35 is pivotally connected at 36. The other end of link 35 is pivotally connected at 37 to a bolt 38 anchored with a nut 39 to wall 32. Rotation of the shaft of motor 33 then rotates arm 34 to move the drawer, whenever, the motor 33 is energized, through a motor control circuit shown generally at 40, FIG. 6.

Referring to FIG. 6, the motor control circuit includes leads 41 and 42 connected to a source of current, a timer clock 43 mounted on the side of housing 10, a switch 44 controlled by the time clock, a relay 45 with a switch blade 46 moved by the relay coil 47, a limit switch 48 and a manually operated control switch 49.

In operation the timer clock is set to actuate switch 44 at desired time intervals. When the switch is closed a circuit is completed from line 41 through switch 44, line 50, the relay coil 47 and lines 51 and 42. The energization of coil 47 moves switch blade 46 to establish a circuit from line 41, through switch blade 46, line 52, contact 53 and the switch blade 54 of limit switch 48, line 55, switch blade 56 of manual switch 49, motor 33 and line 42. This circuit will drive the motor 33 to move the drawer 16 from beneath the outlet opening of hopper 11, over the discharge opening 28 in housing 10 and back again until the drawer engages limit switch 48 to move its switch blade 54 to contact 57 and to break the circuit. Switch 44 remains closed until cam 43a of clock 43 has moved past and is held closed for a period of time longer than is required to reciprocate the drawer, during which time relay 45 remains energized. As the cam 43a moves past switch 44, relay 45 is de-energized. Blade 46 then moves back to the illustrated position and a circuit is completed from line 41, through blade 46 of relay 45, line 57, contact 58 and the blade 54 of switch 48, line 55, blade 56 of switch 49, the motor 33 and line 42 to again operate the motor. The motor will run until the drawer 16 is moved away from the limit switch 48 and the blade of the limit switch has again moved away from contact 58 to break the circuit and to place the blade 54 in engagement with contact 53, ready for another cycle of operation.

Of major importance is the fact that the feeder of the invention insures that proportionate amounts of diverse feeds will be supplied to the feed trough in the volume required for the particular animal or animals to be fed. This is because baffle 12 maintains the feeds in the hopper separated and because they are maintained separate as they fall into the compartments 19 and 20, in volumes determined by the compartment sizes. Obviously, the partition 18 can be positioned to provide any desired relative compartment sizes. Also, a block, not shown, of any desired size can be inserted into one or the other of the compartments 19 and 20 to reduce the compartment size and to change the ratio of feeds supplied to the feed trough 17, or the illustrative pivoted baffle 25 can be used for the purpose. One compartment can be provided with such a baffle, or if desired each compartment can be so provided.

To prevent dirt accumulating in housing 10 to damage the operating parts, end covers 59 are preferably slipped over each open end. Sheet metal screws 60 through the flanges of the end covers and through the side walls of the housing hold the end covers securely in place.

Te described feeder can be constructed sufficiently small that it may be readily moved from feeding area to feeding area for one or a very few animals or it can be made large enough to feed many animals.

Whereas this invention is here described and illustrated with respect to a certain form thereof, it is to be understood that many variations are possible without departing from the subject matter particularly pointed out in the following claim, which subject matter I regard as my invention.

I claim:

1. An automated animal feeder comprising, in combination:

a housing having an inlet opening through its top and a discharge opening through its bottom, offset longitudinally from said inlet opening;

a longitudinally divided hopper on top of the housing, adapted to receive animal feed in each of a plurality of side by side compartments and to discharge said feeds, by gravity, into said inlet opening;

a drawer having an open top and an open bottom and divider means for longitudinally dividing said drawer into compartments corresponding to the compartments of the hopper, said drawer being longitudinally reciprocable within the housing and adapted, when beneath the inlet opening to receive feeds from the compartments of the hopper into the corresponding compartments of the drawer;

guide tracks on the inside of the housing, rollers fixed to and supporting the drawer for easy travel and arranged to roll in the guide tracks;

power means for traveling the drawer from its feed-receiving position beneath the inlet opening to a discharge position the discharge opening, whereby feed in the drawer is discharged through the said discharge opening and back to its feed receiving position;

a cutting blade on the drawer arranged to shear through any feed caught between the housing and the drawer, during travel of the drawer;

means for blocking flow from the hopper into the housing when the drawer is in its discharge position; and means for changing the capacity of at least one of the compartments of the drawer, said means comprising a baffle pivotally suspended from an upper corner of the compartment and means adjustably fixing the angular position of the baffle in the said compartment.

References Cited

UNITED STATES PATENTS

| | | | |
|---|---|---|---|
| 1,378,572 | 5/1921 | Stevens | 222—137 |
| 3,029,790 | 4/1962 | Loudon | 119—51.11 |
| 3,115,866 | 12/1963 | Lawson | 119—56 |

FOREIGN PATENTS 673,806  11/1963  Canada.

HUGH R. CHAMBLEE, Primary Examiner.

U.S. Cl. X.R.

119—56